Nov. 5, 1940.   H. H. CAMPBELL   2,220,863
INDICATOR AND COMPUTING MECHANISM
Filed June 19, 1936   4 Sheets-Sheet 1

Inventor
HENRY H. CAMPBELL.
By Robert Cobb
Attorneys

Nov. 5, 1940.  H. H. CAMPBELL  2,220,863
INDICATOR AND COMPUTING MECHANISM
Filed June 19, 1936   4 Sheets—Sheet 2
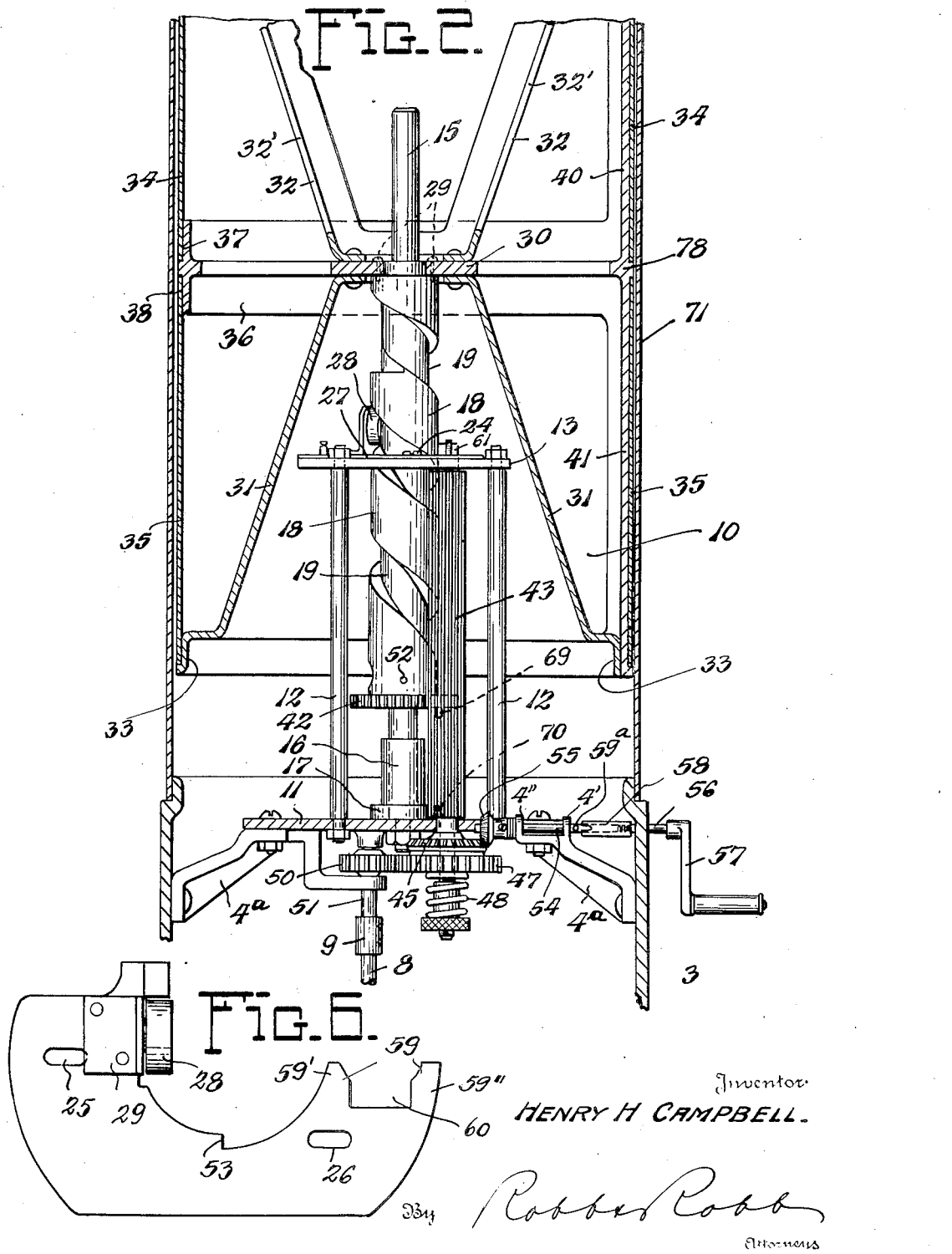
Inventor
HENRY H CAMPBELL.
By Robb & Robb
Attorneys Nov. 5, 1940.  H. H. CAMPBELL  2,220,863
INDICATOR AND COMPUTING MECHANISM
Filed June 19, 1936.  4 Sheets-Sheet 3
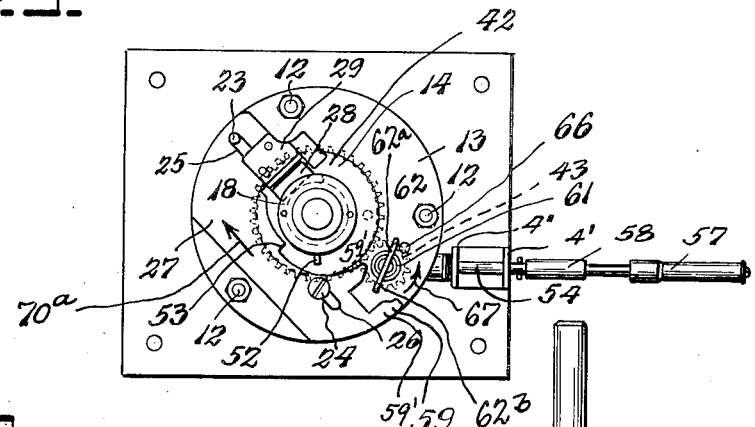
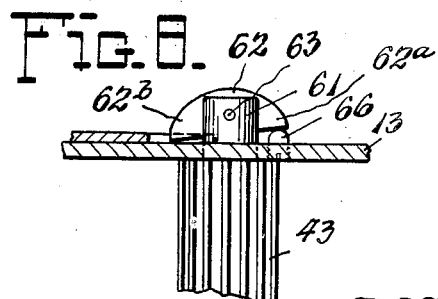
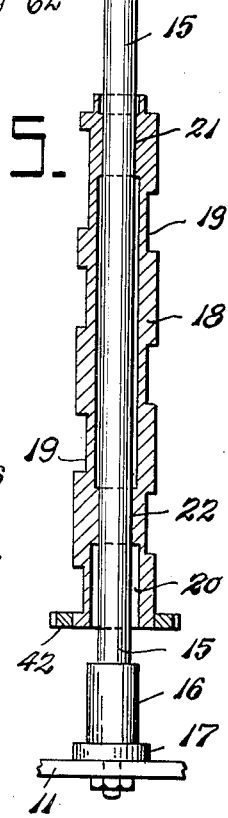
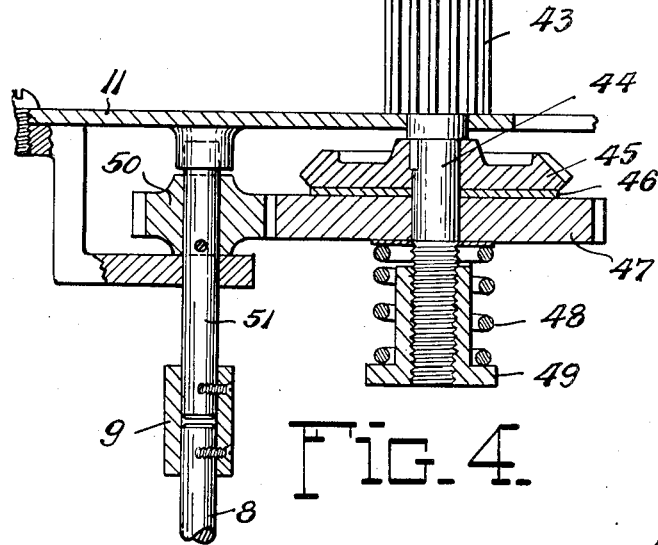
Inventor
HENRY H. CAMPBELL.
By Robbs Cobb
Attorneys Nov. 5, 1940.  H. H. CAMPBELL  2,220,863
INDICATOR AND COMPUTING MECHANISM
Filed June 19, 1936   4 Sheets-Sheet 4
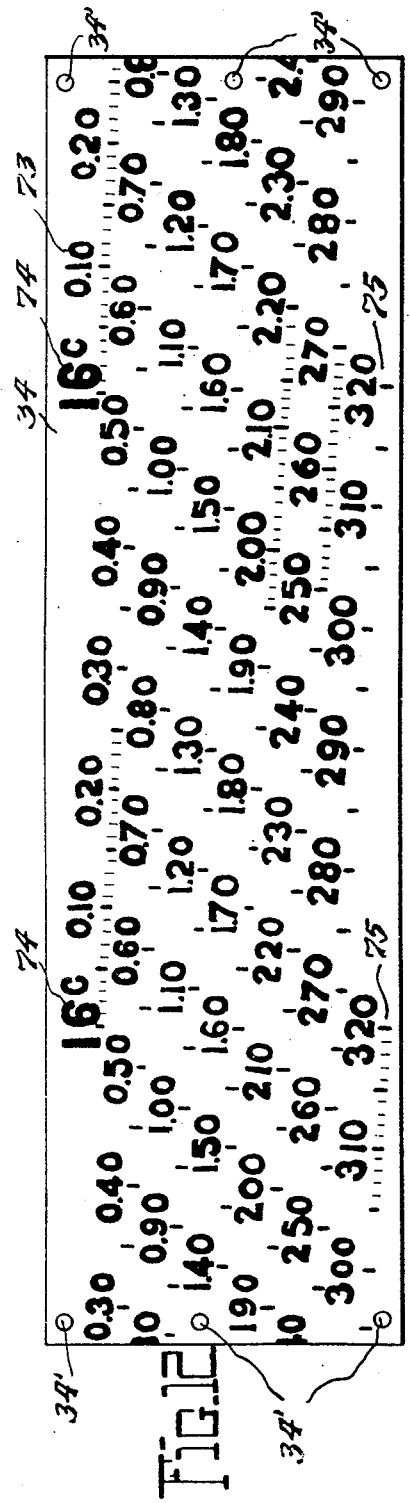
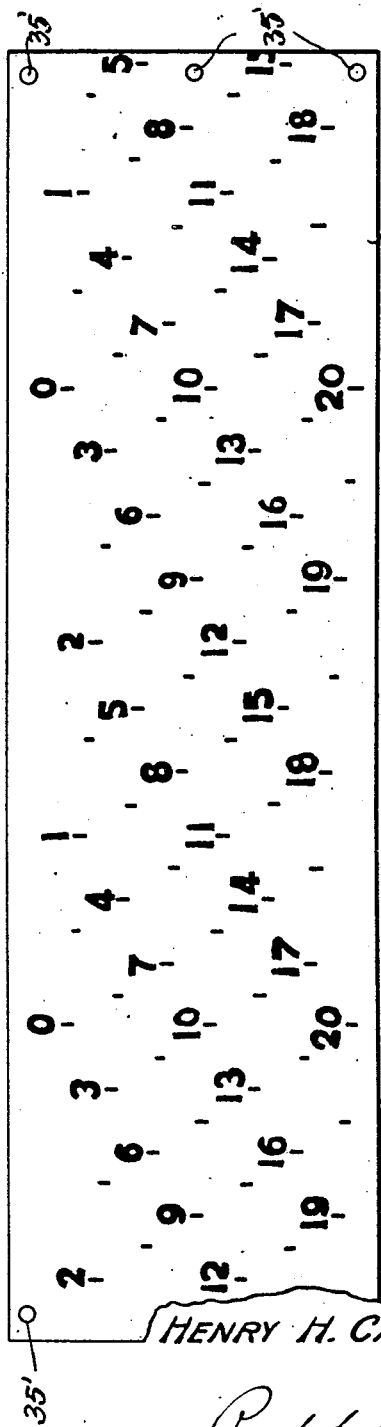
Fig. 12.  Fig. 13.  Fig. 14.
Inventor
HENRY H. CAMPBELL.
By Robert Roth
Attorneys Patented Nov. 5, 1940

2,220,863

UNITED STATES PATENT OFFICE 2,220,863

INDICATOR AND COMPUTING MECHANISM

Henry H. Campbell, Cleveland, Ohio

Application June 19, 1936, Serial No. 86,202

21 Claims. (Cl. 235—67)

Liquid dispensing apparatus such as gasolene pumps, or the like, are provided with indicator and computing mechanism for indicating the amount and the purchase price of liquid dispensed therefrom.

These indicator and computing mechanisms as used today in connection with apparatus of the class referred to above, are very complicated in construction, and are very costly to manufacture, because they comprise numerous parts and mechanisms necessary for carrying out the computing operations. Additional parts are usually supplied with such apparatus for exchange with the parts thereof, to render the indicator and computing mechanism adjustable for various conditions of practise. In other words, the price of liquid to be dispensed from a certain gasolene pump or the like varies, and it is, therefore, necessary that the indicator and computing mechanism can be changed so as to adjust the same to another price per gallon of the fluid to be dispensed.

In certain pump constructions an exchange of certain parts to render the indicator and computing mechanism adaptable for various conditions has been eliminated by the manufacturer, and all the parts necessary for indicating and computing operations within certain predetermined price limits of the fluid to be dispensed are already contained in the indicating and computing mechanism, and for changing the computing mechanism from one unit price to another only certain adjusting or clutching operations have to be performed. However, such devices must carry all original and interchangeable parts necessary for the various computations which make the indicator and computing mechanism a highly complicated structure.

The indicator and computing mechanism of the present invention has, therefore, been designed to overcome the disadvantages of this type of apparatus enumerated above, and to provide an indicator and computing mechanism of very simple construction which can be cheaply manufactured without impairing the accuracy of the device.

Another object of the present invention is the provision of quantity and value indicator members of a very simple construction which may be readily exchanged with other quantity and value indicator means to thereby render the apparatus adaptable for various prices per unit of fluid dispensed.

A further advantage of the present invention is the provision of automatic zeroizing instrumentalities which return the quantity and value indicator automatically to its zero position after the same have reached their maximum indicating or computing position.

Another object of the present invention is the provision of indicator and computing means fixed in the relation to each other and rotatable in unison and in a spiral path to perform quantity and value indications and computations of dispensed liquid.

A still further advantage of the present invention is the provision of a sleeve member provided with a spiral groove and cooperating with an abutment member to impart upon the quantity and value indicator means a rotation in a spiral path as referred to above, which permits the elimination of highly complicated computing gearing systems from such indicator and computing devices which systems have been heretofore necessary for carrying out the computing operations in such apparatus.

The simplicity of the computing mechanism does not affect the accuracy of the indicating and computing operations and this renders the construction of the present invention especially adaptable for purposes of practise.

Other and further advantages of the present invention, may become apparent from the following description and drawings, in which:

Figure 2 is a vertical sectional view of the indicator and computing mechanism, parts being shown in elevation and certain parts being broken away.

Figure 3 is a top view of the indicator and computing mechanism as illustrated in Figure 2, certain parts, however, being omitted for the purpose of clarity.

Figure 4 discloses certain of the driving an clutching mechanism employed in the present invention.

Figure 5 is a detail view of the spiral member and the supporting and cushioning instrumentalities therefor.

Figure 6 is a detail plan view of the control shuttle used in connection with the present invention.

Figure 7:
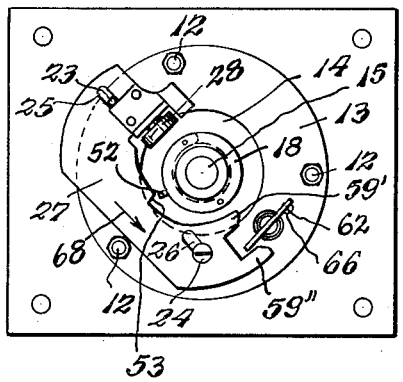

Figure 7 is a view similar to Figure 3 illustrating the control shuttle in another position from that shown in Figure 3.

Figure 9:
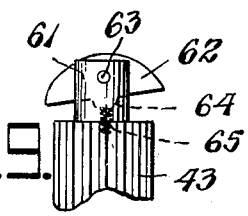

Figures 8 and 9 are detail views of the shuttle actuator.

Figures 10, 15:
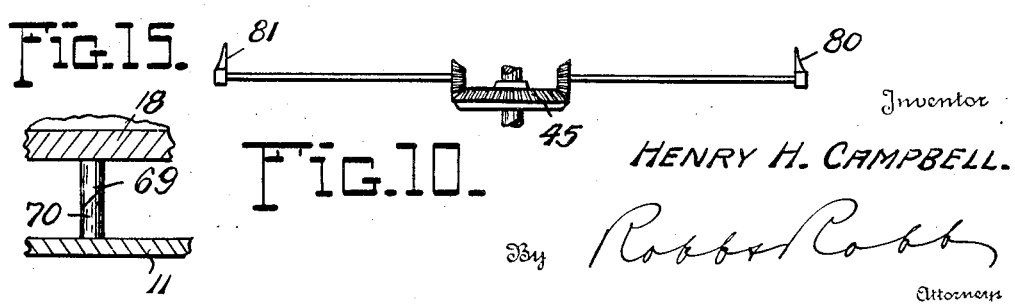

Figure 10 is a diagrammatic view illustrating an auxiliary indicator mechanism which may be used in conection with the present invention.

Figure 1:
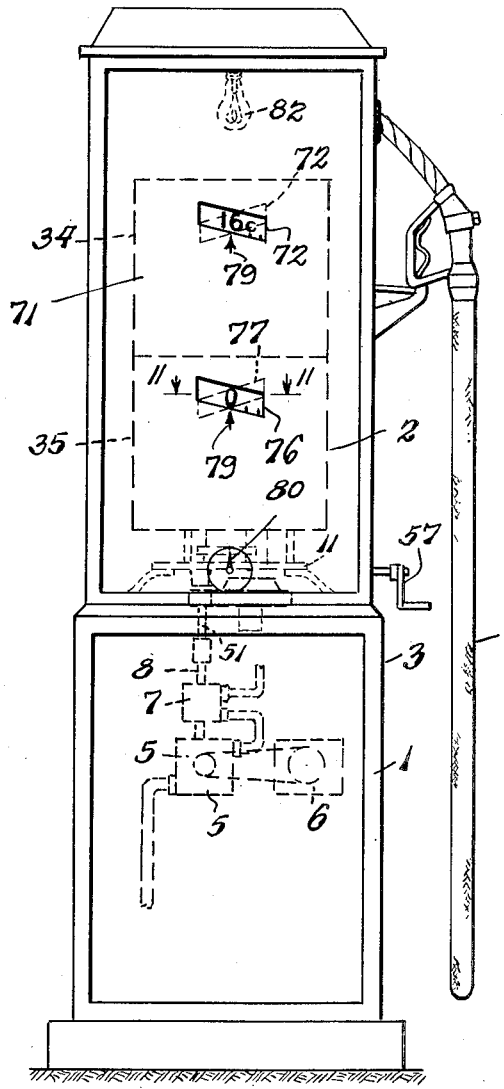
Figure 1 illustrates a front elevation of a gasolene pump provided with the indicator and computing mechanism of the present invention.
Figure 11:
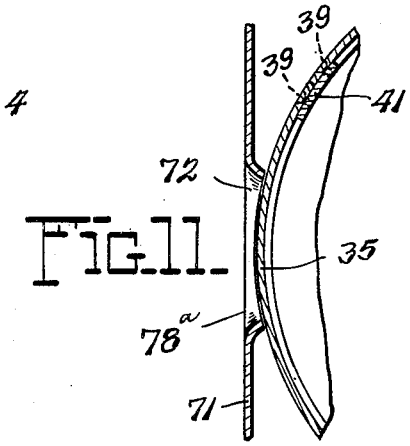

Figure 11 is a sectional view through a portion of the indicator mechanism and the pump housing taken on line 11—11 of Figure 1.

Figure 12 illustrates the value indicator member.

Figure 13 shows the quantity indicator member.

Figure 14 is a side elevation of one of the value or quantity indicator members disclosing the location of the fastening means with which these indicator members are secured to other parts of the indicator mechanism.

Figure 15 is a detail view of abutment members arranged between the sleeve and base.

Referring first to Figure 1, 1 indicates a gasolene pump or dispensing apparatus of commercial construction, which is provided with an indicator and computing mechanism 2 of the present invention. The gasolene pump 1 consists of a housing 3, hose 4, pump 5, motor 6 and meter 7.

Extending from the meter 7 (see Figures 2 and 4) is the meter shaft 8, the amounts of revolution of which are dependent upon the quantity of fluid discharged from the apparatus. In view of the fact that all the structure referred to hereinbefore is of a very well known commercial construction, no specific reference will be made as to the operation of those various parts. Connected to the meter shaft 8 by means of a coupling 9 is an indicator and computing mechanism generally indicated at 10. This indicator and computing mechanism comprises a base member 11 mounted within the housing 3 of the fluid dispensing apparatus by means of brackets 4a (see Figure 2) in any convenient manner.

The base member 11 carries a plurality of supporting members 12 which carry a plate 13 provided with a circular opening 14 as will be clearly seen from Figures 3 and 7. Secured to the base 11 and centrally located with respect to the plate 13 is a spindle 15 provided with a bushing 16 and rubber ring 17 near its end which is secured to the base 11.

A sleeve 18 (see Figure 2) provided with a spiral camming groove 19 is adapted to slidably fit over the spindle 15 and is provided with a recess portion 20 for the reception of the bushing 16. The bushing 16 is of such a diameter as to properly fit into the recess 20 permitting only a slow escape of the air entrapped within said recess when the sleeve 18 slides over the bushing 16 during the operation of the indicator mechanism so that an air cushion between the parts 18 and 16 is formed so as to permit a noiseless operation of the same and cushion the fall of the sleeve 18, as will be further seen from the following description.

The sleeve 18 is provided with the bearing portions 21 and 22 which are relatively small with regard to the entire length of the sleeve so as to reduce the friction between the spindle 15 and the sleeve 18 to a minimum. Slidably mounted upon the plate 13 by means of a pin 23 and a screw 24 which cooperate with slots 25 and 26 respectively, is a control means or shuttle 27 which is provided with an abutment member 28 which may be preferably a roller carried by a bracket 29 secured to the control shuttle 27. The abutment member 28 is adapted to engage the spiral groove 19 of the sleeve 18 so that if the latter is rotated in regard to the said abutment 28, it will be shifted in regard to the spindle 15 and plate 13 for purposes as will be more fully explained later on.

Secured to the sleeve 18 to 29, is a flange 30 which carries conically shaped supporting members 31 and 32 bent at their ends 33, so as to receive a value indicator member 34, and a quantity indicator member 35, and to support the same. The flange 30 carries a rim-like extension 36 which is recessed at 37 and 38 for the reception of the members 34 and 35 aforementioned.

The indicator members 34 and 35 (see Figures 12 and 13) consist of a strip of sheet metal, Celluloid, or like material, and carry certain value or quantity indicia thereon, as will be described more fully later on. These indicator members are further provided with openings 34' and 35' through which screws 39 may be inserted for securing indicator members to a downwardly and upwardly extending portion of the flange 36 as shown at 40 and 41, see also Figure 11.

In other words, the outer flange portion 36 and the supports 31 and 32 form a supporting structure upon which the indicator members may be arranged by bending the same into a drum-like configuration and by attaching the same to said supporting structure by the securing means 39 above referred to.

The conical support 32 (see Figure 2) is also provided with openings 32' for admitting light to the rear wall of the indicator members 34 and 35 to thereby illuminate the same and to make value and quantity indicia printed thereon, clearly visible to an observer looking upon such indicators from the opposite side.

The sleeve 18 has a portion near the base 11 which is provided with a gear 42 which is in operative engagement with a long pinion gear 43 mounted between the base 11 and the plate 13. Keyed to the pinion shaft 44 is a beveled gear 45 while a friction disc 46 and a gear 47 are loosely rotatably mounted upon the shaft 44, the gear 47 being held in frictional engagement with the friction disc 46 and beveled gear 45 by means of a coil spring 48 interposed between the gear 47 and an adjustment nut 49. The spring 48 is held under slight tension by the adjustment of the nut 49 and produces a frictional contact between the parts 45, 46 and 47 as aforementioned. Cooperating with gear 47 is a pinion 50 keyed to shaft 51, which is secured to shaft 8 by means of the coupling 9 already referred to in the above.

Rotation of the meter shaft 8 will be, therefore, transferred over the pinion 50 and gear 47 to the bevel gear 45 over the friction member 46. The beveled gear 45 being keyed to shaft 44 will cause rotation of the long pinion gear 43 which in turn causes a corresponding rotation of the sleeve 18 in view of the fact that the gear 42 is in engagement with the pinion 43. Rotation of the sleeve 18 will cause an upward movement in a spiral path of the same with respect to the base plate 11 when the abutment member 28 is in engagement with the spiral groove 19. The sleeve 18 will, therefore, travel, from its lowermost position in which the portion adjacent the gear 42 contacts with the rubber ring 17, upwardly to its highest operated position at which a pin 52 will contact an extension 53 of the control shuttle 27 and shift the latter from its position in Figure 3 to its position in Figure 7 thereby disengaging the abutment member 28 from the spiral groove 19. The sleeve 18 will then drop downwardly on account of its own weight. The part 16 and recess 20 will function so as to cushion the downward fall of the sleeve in a manner as previously described, and an additional cushioning effect is produced by the rubber ring 17 upon the sleeve which finally will be again supported at its lowermost position.

If the abutment member 28 is now again engaged with the spiral groove 19 and the sleeve is again rotated in a manner as previously described, the upward travel of sleeve will repeat and continue until the shuttle 27 is again tripped into what is termed for the purposes herein zeroizing action by means of the shuttle release trip 52, as previously mentioned.

One of the base supporting members 4a is provided with bearing portions 4' and 4" which receive a shaft 54 having a bevel gear 55 keyed thereto, the same being in cooperative engagement with the bevel gear 45 previously referred to herein.

Another shaft 56 (see Figure 2) provided with a crank 57 and coupling sleeve 58 is provided for engaging a pin 59a of shaft 54 to transfer rotation from the handle 57 and shaft 56 to the shaft 54 to thereby rotate the bevel gear 45 and the long gear pinion 43 independently of the driving mechanisms 47 and 50 for purposes as will become apparent later on.

Within the sleeve 58 and between the shaft 54 and shaft 56 is a coil spring for forcing the sleeve 58 which is integral on the shaft 56 out of engagement with the pin 59a so that the crank or handle 57 is generally disengaged from the shaft 54. The control shuttle 27 is provided with fork-like extensions 59 opposite its end which carries the abutment mmeber 28. The fork-like extensions 59 define a recess 60 therebetween. The upper end of the long pinion gear 43 is provided with a shaft portion 61 which extends through the plate 13 and carries the shuttle actuator 62 pivotally secured to the shaft 61 at 63, see Figure 8.

From Figure 9 it will be seen that the shuttle actuator is provided with a semi-circular portion 64 engaged by a coil spring 65 mounted within the end of the shaft 61 in a manner as clearly seen from Figure 9. This coil spring 65 exerts a slight pressure against the portion 64 of member 62 to thereby maintain the member 62 in its positions of adjustment. In other words, the spring 65 counteracts the force of gravity of the member 62. Within the path of the shuttle actuator 62 and on the plate 13 is an abutment member 66. The portion of this member 66 which protrudes from the plate 13 is of semi-spherical configuration.

The shuttle actuator rotates with the long pinion gear 43 and when the control shuttle is in a position as shown in Figure 3, the shuttle actuator 62 will be tilted by means of the abutment 66 so as to pass over portion 59' of fork 59 during its rotation in a direction as indicated by an arrow 67.

To explain the movement of the shuttle actuator somewhat more specifically, reference is made to Figures 3 and 8. It will be noted that the portion 62a of the shuttle actuator has just been lifted upwardly by passing over the abutment member 66 during its course of rotation in the direction of the arrow 67. The opposite end of the shuttle actuator 62b assumes a downwardly inclined position as clearly seen from Figure 8. It practically touches the plate 13. However, it does not touch any part of the shuttle member 27 because the downward shifting of the part 62b occurs at a time when it has already passed the extension 59'. The extension 59" does not extend into the path of the shuttle actuator 62 when the control shuttle 27 is in a position as seen in Figure 3. Therefore, with the parts in position as shown in Figure 3, the shuttle actuator performs no shifting operation of the control shuttle.

However, when the control shuttle has been shifted by the shuttle release trip to perform tripping operation of the sleeve 18, the portion 59" of the shuttle member 27 has been brought into the path of the shuttle actuator 62, so that upon rotation of the latter in a direction as shown by an arrow 67 in Figure 3, the portion 59" of the shuttle 27 is engaged by either of the portions 62a or 62b of the shuttle actuator (depending upon which one is in the proper position for engagement with the member 59").

Engagement of the shuttle actuator 62 during its rotation with the portion 59" of the control shuttle 27 will cause a shifting of the latter in a direction as indicated by an arrow 68 in Figure 7. The shuttle will be returned to a position as shown in Figure 3, in which position the abutment member 28 again engages the spiral groove 19 of the sleeve 18 provided the sleeve 18 is in the proper position in regard to the abutment member 28 so that the latter may enter again the spiral groove 19 of said sleeve.

It follows, therefore, that after tripping of the shuttle 27 to release the abutment 28 from its engagement with the sleeve 18 and after the downward movement of the sleeve to its original position of elevation, the latter must be rotated around its spindle 15 so as to bring the spiral groove within the sleeve into the proper stopping position with regard to the abutment member 28 so that the same may be shifted into said groove by the actuation of the control shuttle effected by the shuttle actuator thereof.

To return, therefore, the sleeve 18 to its exact stopping position not only in regard to its up and down movement, but also in regard to its rotative movement, a pin 69 is provided at the lower portion of the sleeve adapted to engage with a pin 70 mounted upon the base 11 when the starting position of the sleeve 18 has been reached.

It follows therefrom that when the sleeve 18 (see Figure 2) reaches its maximum position of elevation, it is automatically dropped to its original position of elevation and because the tripping of the control shuttle 27 by the shuttle release trip 52 is effected at a point of rotation which corresponds to the starting point of the sleeve, the dropping of the sleeve will happen directly above its original point of starting in which position pin 69 will be substantially over pin 70. To prevent, however, the pin 69 striking the top of pin 70 and preventing a full return of the sleeve member 18, the pins 69 and 70 are provided with a beveled point as clearly seen from Figure 15, so that the pin 69 may slightly slide with respect to the pin 70 and cause a very slight rotation of the sleeve 18 in case the sleeve 18 is not exactly in its zero position when it is automatically dropped from its maximum position of operation.

The sleeve member 18 reaches its maximum position only in case shaft 8 is maintained in rotation for a sufficient length of time necessary for such operation. However, if the dispensing apparatus of which the meter shaft 8 is a part is not operated a sufficiently long period to permit the sleeve to reach its maximum position, it will be maintained in any position of elevation between its zero and maximum position, at which the operation of rotation of shaft 8 is stopped. To return the sleeve to its zero position in such a case, it is only necessary to exert an inward pressure upon handle or crank 57 to cause clutching engagement thereof with shaft 54 so that upon the rotation of the handle and said latter shaft, bevel gear 45 is rotated. The crank 57 must be rotated in such a direction as to cause rotation of gear 45 in a direction opposite from that in which it was driven by gear 50.

The gear 43 and the shuttle actuator 62 (see Figures 3 and 8) are now rotated in a direction opposite to that of the arrow 67 in Figure 3, and in view of the inclined position of the part 62 as effected by the abutment 66, when it is rotated in such direction, it will then engage with its portion 62a or 62b, the portion 59' of the control shuttle 27 and shift the same in a direction as indicated by an arrow 70 in Figure 3. This will disengage the abutment member 28 from the spiral groove of the sleeve 18 and the sleeve 18 will drop downwardly to its starting position of elevation.

During the rotation of the crank 57 to effect the shifting of the control shuttle and the downward movement of the sleeve 18, the sleeve 18 is also rotated, and after the sleeve 18 has dropped to its starting position of elevation, it may be further rotated by operating crank 57 until pin 69 abuts against pin 70. The sleeve is now in its exact starting position.

It has already been previously mentioned that the sleeve 18 carries by means of flanges 30 and 36 and conical supporting members 31 and 32, value and quantity indicator means. These value and quantity indicator means are rigidly secured to the sleeve 18 and perform the same motion as the latter.

The value indicator means consists of a strip of flexible material 34 (see Figure 12) upon which value indicia are imprinted, engraved, or otherwise marked. The indicia are arranged in such a manner that when the member 34 is bent into circular shape, the indicia will be in a continuous spiral form, running from zero to a certain predetermined maximum value denomination. The value indicator strip does not only carry a single spiral of value indicia imprinted thereon, but carries two of such indicia spirals offset with respect to each other at 180 degrees, so that when the value indicator is arranged within the housing of the indicating mechanism generally designated 71, a certain value designation will be visible at both sides of the housing 71 through windows 72, one of said windows being shown in Figure 1. The other window 72 is positioned in the rear wall of the housing opposite the wall 71a, and is indicated in dotted lines in Figure 1. The windows 72 and also the windows 76 and 77, which will be described later on, are inclined to the same degree as the inclination of the indicia carried by the value and quantity indicator so that the same is clearly visible while it passes said windows or openings.

A detail view of the value indicator is shown at Figure 12. Value indicia 73 are imprinted upon the member 34 in such a manner that if the same is bent into the circular or cylindrical configuration, the indicia imprinted thereon will be in spiral form beginning at a zero point 74 up to a certain maximum value designation 75; as already mentioned before there are two spiral rows of value designations offset with respect to each other 180 degrees, as will be clearly seen from Figure 12.

The quantity indicator as shown at 35 in Figure 13 is of a similar construction as the value indicator shown in Figure 12, the difference being that the quantity indicator carries certain quantity indicia which may be seen through windows or openings 76 and 77 of the housing 71 of the indicator and computing mechanism.

If the indicator and computing mechanism of the present invention is to be used in connection with a dispensing apparatus for gasolene, or the like, the quantity indicia of the member 35 may be preferably designated in gallons while the value indicia of the member 34 are designated in cents and dollars.

The value indicator and the quantity indicator are mounted upon the supporting structure of the indicating mechanism which is generally designated by the reference numeral 78. Both indicators when attached to the support 78 are in a certain fixed relation with respect to each other so that if the indicating mechanism is in its zero position, such position of the indicator is clearly visible through the windows 72, 76 and 77. In other words, the zero mark of the quantity indicator will be directly in front of either the window 76 or 77 while the zero mark of the value indicator is directly in front and visible through the windows 72. The zero mark of the value indicator as indicated at 74 in Figure 12 may preferably carry the price designation of one gallon of gasolene to be dispensed from the gasolene pump in connection with which the value indicator is to be used so that when the value indicator is at its zero position, which will be the position prior to any dispensing operation of the pump, a customer may readily see through the windows 72, the purchase price per gallon of the gasolene dispensed from the pump.

The walls of the housing 71 which carry the windows 72, 76 and 77 may be slightly bent inwardly, as shown at 78a, at the portion of the windows so as to bring the portion of the housing 71 adjacent the windows 72, 76 and 77, as close to the value and quantity indicators as possible, to facilitate an easier reading of the indicia imprinted thereon. The housing may carry adjacent the windows thru which the indicator designations are visible arrow marks 79 which indicate the proper position for obtaining correct value and quantity readings.

The arrangement of the indicia on the value indicator and the position of the value indicator with respect to the quantity indicator are such that when the quantity indicator shows a certain amount of liquid dispensed, the value indicator shows the proper purchase value of such amount of liquid. The value indicator may be replaced by another value indicator with different value designations when liquid of another price is to be dispensed from the pump with which the indicator or computing mechanism is associated, or when the price of the liquid to be dispensed has been changed. It will, therefore, be seen that the indicator of the present invention may be readily and very easily changed for desired value designations by changing the value indicator 34 and in view of the fact that this is the only exchange which is necessary to render the indicator and computing mechanism adaptable for various price designations per gallon of liquid dispensed, its operation and use are very simple.

When the indicator and computing mechanism of the present invention is to be used in connection with gasolene dispensing apparatus or pumps three of which are usually used by a gasolene dealer, as there are usually three grades of gasolene dispensed by such stations, it is only necessary to provide the indicator and computing mechanisms of all three of such dispensing units with one set of value indicator members with indicia for certain price ranges within which the gasolene price fluctuates. In other words, the gasolene dispensed from three pumps of a gasolene station will be of different grades and prices, and therefore, only one value indicator member for certain price per gallon of gasolene for all three pumps is necessary.

Operation of mechanism

The operation of the indicator and computing device is as follows:

Before the dispensing operation, for instance of gasolene from a gasolene dispensing system, as shown in Figure 1, the quantity and the value indicators are at their zero position (as seen in Figure 1). The value indicator indicates at its zero position, the price of the gasolene per gallon which in this instance is .16 (sixteen cents).

If gasolene is to be dispensed from the pump the hose 4 which is provided with a control valve is removed from its supporting structure on the pump which automatically starts the motor of the dispensing system and when the valve is now opened, fluid may be readily dispensed into a tank or the like; the operation of the dispensing system of the pump will cause rotation of the shaft 8 which is associated with a meter for measuring the dispensed quantity of fluid in such a manner as to cause certain revolutions of shaft 8 which are directly in proportion with the amount of liquid dispensed.

The rotation of shaft 8 will be transferred to the sleeve 18 in a manner, as previously described herein, and the sleeve 18 will begin to rotate together with the quantity and value indicators 34 and 35 which are secured to the same by means of the supporting structure 78. In view of the fact that the spiral groove 19 of the sleeve 18 is engaged by the abutment member 28, the sleeve will be raised upwardly during its rotative movement. The value and quantity indicators will, of course, perform the same movement with the sleeve 18 as they are attached to the latter. They move upwardly during their rotation in such a manner that a point on their circumference will describe an upwardly traveling spiral path.

In view of the fact that quantity indicia and the value indicia on each of the members 34 and 35 are arranged in a spiral manner, the same will become visible at the respective windows 76, 77 and 72 at both sides of the indicating apparatus during the operation of the same. When five (5) gallons are dispensed, the numeral 5 will appear at both lower windows, while at both of the upper windows the value designations 0.80 (eighty cents) will appear. When ten (10) gallons have been dispensed, the designation 10 appears at the lower windows, and the purchase price 1.60 (one dollar sixty cents) will appear at the upper windows. In this way the gallons are computed, beginning at zero up to the maximum for which the quantity indicator is constructed, and correspondingly the value indications will begin with zero and compute up to a certain amount which is in a certain price relation to the maximum of the liquid dispensed. The present indicator and computing apparatus is arranged for a dispensing operation of a quantity of twenty (20) gallons and when this amount has been dispensed, the shuttle release trip 52 will trip the control shuttle 27 in a manner as previously described.

The abutment 28 will disengage from the sleeve 18 and the latter will drop down together with the value and quantity indicators carried thereby to its original starting position.

Any very slight deviation from the original starting point of the sleeve 18 will be corrected when the pins 69 and 70 contact with their inclined surfaces. The indicating and computing mechanism is now in the same position in which it was before the dispensing operation described. Further operation of the dispensing system will repeat the quantity and value indicating operations. If the maximum amount for which the value and quantity indicators are arranged is not dispensed from the dispensing system, the sleeve 18 and the indicators 34 and 35 have to be returned to their zero position by a manual operation of the crank 57. In other words, when for instance ten (10) gallons are dispensed from the dispensing apparatus, the quantity indicator will indicate the amount of ten (10) gallons, and the value indicator will indicate a price of 1.60 (one dollar sixty cents) at each side of the indicator housing. The valve 4a of the dispensing system has been closed and the hose 4 replaced into its position on the gasolene meter 1 as shown in Figure 1. Crank 57 is now operated and beveled gear 45 and pinion 43 together with a shuttle actuator 62 are rotated in a direction opposite the direction of arrow 67 in Figure 3. The shuttle actuator 62 will therefore engage the forklike extension 59' of the control shuttle 27 and shift the same into a position as shown in Figure 7, and the abutment is disengaged from the sleeve 18 which drops downward to its original position of elevation.

At the same time the rotation of the crank 57 causes a rotation of the sleeve 18 around its vertical axis which is continued until pins 69 and 70 abut against each other and the value and quantity indicators as well as the sleeve 18 have reached their original zero position.

In this way, any quantity of liquid may be discharged from the system and a proper indication of the amounts and value of fluid dispensed may be had while the indicator apparatus may be readily returned to its zero position either automatically when it reaches its maximum position of indication or manually when it is stopped at any place before such maximum position. The manual returning of the indicator mechanism to its zero position may be expedited by increasing the size of the bevel gear 55 or by constructing the apparatus described herein in such a manner that two zero positions, 180 degrees spaced from each other, are provided. The indicators are each provided with two complete indicia systems spaced 180 degrees from each other so that it is very simple to arrange the device for two zero positions as mentioned above. In this case, however, it would be necessary to provide the sleeve 18 with two spiral grooves which are also disposed with regard to each other 180 degrees.

Some States may require that if gasolene dispensing systems are provided with indicating instrumentalities of a type as referred to herein, auxiliary indicating means must be installed thereon, which usually comprise pointers 80 and 81, one on each side of the indicating apparatus which continuously rotate during the dispensing operation. One rotation of the pointers indicates the dispensing of one (1) gallon of gasolene. The pointers 80 and 81 may be readily driven from the gear 45 in a manner as will be clearly seen from Figure 10.

An electric lamp 82 may be arranged within the housing and above the indicator members as seen in Figure 1 for illuminating the indicator members.

While it has been mentioned hereinbefore that the indicator mechanism is automatically zeroized upon reaching its maximum indicating position, the device may be adjusted so as to automatically zeroize itself only when its operation is continued over the maximum indicating position thereof. The automatic tripping of the sleeve and indicator means will, therefore, be accomplished only when the indicating operation exceeds for instance the amount of twenty (20) gallons—if this is not the case, the indicator means must be manually returned to their original position in a manner as previously described in detail.

The pins 69 and 70 may be made without inclined surfaces if an alignment as hereinbefore mentioned is not desired or not necessary. In such case the pins are so positioned that their side-wise abutment indicates the zero position.

The indicator mechanism of the present mechanism may be provided with single indicator means to indicate either the quantity or value, or the mechanism may be provided with both indicating and computing means as shown in the accompanying drawings.

The apparatus of the present invention may be used not only in connection with fluid dispensing means but also with other proportioning or weighing means and its applications to such uses will be readily apparent to those skilled in the art.

Having thus described my invention, what I claim as new and desire to secure by Letters Patent of the United States, is:

1. A device of the character described, comprising, in combination, a casing provided with a plurality of separate openings, cylindrical indicating and computing means within said casing bearing related quantity and value indicia visible through said separate openings during indicating and computing operations of the device, means for simultaneously rotating and axially shifting said indicating and computing means from a zero to a maximum position and means automatically operable when said indicating and computing means reaches a predetermined position including devices for disconnecting the axial shifting means from the said cylindrical indicating means for effecting the return of said indicating and computing means to its zero position.

2. Indicator mechanism for liquid dispensing systems, comprising, in combination, a housing provided with openings, related quantity and value indicia members within said housing and fixed in relation to each other, a supporting and operating structure for the quantity and value indicia members for rotating the same adjacent said openings to indicate quantity and value of dispensed fluid, said supporting and operating structure comprising a sleeve and an abutment cooperating with the latter, shuttle means for controlling the cooperation of said abutment and sleeve, and trip means for said shuttle means operable after movement of said operating structure from its zero position for interrupting the cooperation between said abutment and sleeve whereby said supporting and operating structure may be returned to its original position.

3. Indicator mechanism for liquid dispensing apparatus, comprising, in combination, a housing provided with openings, an indicia bearing cylindrical indicator member within said housing and adjacent said openings, an indicator supporting structure including a sleeve provided with a spiral groove and a stationary abutment member projecting into said groove and engaging said sleeve, means for rotating said sleeve with respect to said abutment member for axially shifting the sleeve to correspondingly move the indicator member to render portions of the indicia visible through said openings, means for disengaging said abutment from said sleeve including parts for disconnecting the abutment from the indicator groove to thereby stop the axial shift of said sleeve and permit return of the same to its original position, and instrumentalities adapted to act on said disengaging means for reestablishing cooperative engagement between said abutment and said sleeve upon subsequent rotation of said sleeve.

4. Indicator mechanism comprising, in combination, a housing provided with openings, an indicia bearing indicator member within said housing and adjacent said openings, an indicator supporting structure including a sleeve provided with a spiral groove and an abutment member projecting into said groove and engaging said sleeve, means for rotating said sleeve with respect to said abutment member for axially shifting the sleeve to correspondingly move the indicator member to render portions of the indicia visible through said openings in relation to the rotation and axial shift of said sleeve, and instrumentalities for disengaging the abutment and sleeve upon subsequent operation of the indicator mechanism.

5. A device of the character described, comprising, in combination, a casing provided with vision means, an indicating unit mounted in the casing and having a bias toward zero position and carrying indicating indicia to be rendered visible at the vision means of the casing, means for actuating said indicia unit varying degrees of movement to present different indicia thereof at the vision means of the casing, and means including parts disconnectable from the indicia unit automatically operable upon movement of said indicating unit to a predetermined point for conditioning said actuating means to permit the return of said indicating unit under the influence of its bias to a position for repeating its indicating operation.

6. In a device of the character described, in combination, a housing, an indicator unit having indicia and movable to render said indicia visible, operating means for the indicator unit comprising a sleeve provided with a spiral groove, a member having means to engage in said groove, and gearing to rotate the sleeve for causing axial movement thereof with the indicating unit by cooperation of said member with the groove, said gearing comprising a driven gear applied to the sleeve to turn therewith, and a driving gear coacting with the driven gear and maintaining engagement with the driven gear at all times during axial and rotative movement of the sleeve.

7. In a device of the character described, in combination, a housing, an indicator member having indicia and movable to render said indicia visible, operating means for the indicator unit comprising a sleeve provided with a spiral groove, a shuttle member having means to engage in said groove, gearing to rotate the sleeve for causing axial movement thereof with the indicating member by cooperation of the shuttle means with the groove, said gearing comprising a driven gear applied to the sleeve to turn therewith, and a driving gear coacting with the driven gear and maintaining engagement with the driven gear at all times during axial and rotative movement of the sleeve, and means for interrupting the connection of the shuttle means with the sleeve at a predetermined point in the movement of the sleeve and the indicating member, the sleeve and indicating member being mounted for gravitation so as to return to substantially zero position upon the interruption of the connection between the shuttle means and the sleeve.

8. In a device of the character described, in combination, a housing, an indicating unit therein, means for rotating said unit and at the same time imparting axial movement thereto to render visible indicia of said unit, mechanism automatically operable for discontinuing the axial movement of the unit at a predetermined time in its movement including parts to prevent interruption of rotation of said unit when the axial movement is discontinued, and manual means operable on said mechanism for discontinuing the axial movement of the unit previous to the timed automatic discontinuance of such movement and returning such unit to a normal or zero position.

9. In a device of the character described, in combination, a housing, an indicating unit therein, means for rotating said unit and at the same time imparting axial movement thereto to render visible indicia of said unit, mechanism automatically operable for discontinuing the axial movement of the unit at a predetermined time in its movement including parts to prevent interruption of rotation of said unit when the axial movement is discontinued, and manual means operable previous to the timed automatic discontinuance of such movement for interrupting the operating relation between the axial moving means and the unit to permit the axial return of such unit to a normal or zero position, said manual means comprising instrumentalities to automatically restore the operating relation between the axial moving means and the indicating unit upon initiation of an ensuing rotation of the indicating unit to cause a subsequent indicating operation thereof.

10. In a device of the character described, in combination, an indicating unit movable to carry indicia thereon to a vision point, operating means for imparting rotative and longitudinal movement to said indicating unit for rendering its indicia visible, stop devices for positioning the indicating unit substantially at a normal or zero position, means automatically operable for causing the return of the indicating unit to a position to recommence its indicating operation after said unit has moved to a predetermined point in its indicating movement, said operating means being constructed and arranged to cause cooperation of the stop devices to position the indicating unit at said normal or zero position, and manual means for operating said last mentioned means for returning the indicating unit to normal or zero indicating position previous to the action of the automatic means aforesaid, when said manual restoration is desired, said manual means including gearing for causing rotation of the indicating unit in a direction opposite to its movement by which it is carried to indicating positions.

11. Indicator mechanism for liquid dispensing systems comprising, in combination, an indicator unit having indicia and movable from a zero position to render said indicia visible, operating means for said indicating unit comprising drive mechanism for imparting a rotating movement to said indicating unit and driving mechanism for imparting axial movement to said indicating unit, said mechanisms being adapted to operate simultaneously to move said indicating unit in a spiral path, control means operable to cause engagement and disengagement of said axial driving mechanism with respect to said indicator unit, and actuating means for operating said control means to effect spiral movement of said indicating unit from zero position through said operating means including mechanism operable on said control means for effecting engagement of said axial driving mechanism with respect to said unit when said unit is substantially in a zero position.

12. Indicator mechanism for liquid dispensing systems comprising, in combination, an indicator unit having indicia and movable from a zero position to render said indicia visible, operating means for said indicating unit comprising driving mechanism for imparting a rotating movement to said indicating unit and driving mechanism for imparting axial movement to said indicating unit, said mechanisms being adapted to operate simultaneously to move said indicating unit in a spiral path, said indicating unit being biased for axial movement toward a zero position, control means operable to cause engagement and disengagement of said axial driving mechanism with respect to said unit, and actuating means for said control means movable manually in a first direction to effect disengagement of said axial driving mechanism for an axial return of said indicating unit under the bias thereof and automatically operable upon movement of said indicating unit to zero position in a second direction for effecting engagement of said axial driving mechanism with respect to said unit for moving said unit in a spiral path from zero position by said operating means, and means automatically operable to move said control means in said first direction for effecting disengagement of said axial driving mechanism upon movement of said indicating unit to a maximum predetermined position without interruption of said rotating driving mechanism, said last named means and said actuating means cooperating to permit continued operation of said indicating unit.

13. In indicating means for liquid dispensers, a spiral cam mounted for axial and rotational movements, a drum concentrically arranged with respect to the cam and fixed thereto, a chart carried by the drum, means for rotating the cam and drum while permitting axial movement thereof, a fixed support arranged adjacent the cam, a shuttle mounted on said support for movement transversely of the cam, an abutment carried by the shuttle normally cooperating with said cam to move the latter with its drum axially when the cam and drum are rotated, and means for moving said shuttle back and forth to cause said abutment to move into and out of operative relation with said cam.

14. In indicating means for liquid dispensers, a spiral cam mounted for axial and rotational movements, a drum concentrically arranged with respect to the cam and fixed thereto, a chart carried by the drum, means for rotating the cam and drum while permitting axial movement thereof, a fixed support arranged adjacent the cam, a shuttle mounted on said support for movement transversely of the cam, an abutment carried by the shuttle normally cooperating with said cam to move the latter with its drum axially when the cam and drum are rotated, and means actuated by the reversal of movement of said drum and cam moving means for shifting said shuttle to withdraw said abutment from operative relation with the cam, whereby said cam and drum may be moved axially without rotation.

15. Indicator mechanism for liquid dispensing systems, comprising, in combination, a housing provided with an indicia bearing indicator member, a supporting and operating structure for simultaneously rotating and axially shifting said member comprising a spiral camming sleeve and an abutment cooperating with said sleeve, shuttle means operable to effect relative movement of said sleeve and abutment into and out of cooperating relationship, and instrumentalities for actuating said shuttle means to control the cooperation between said abutment and sleeve.

16. Indicator mechanism for liquid dispensing systems comprising, in combination, an indicator unit having indicia and movable to render said indicia visible, operating means for simultaneously rotating and axially shifting said indicating unit comprising a member provided with a spiral camming groove, an abutment member projecting into said groove, one of said members being rotatable relative to the other of said members for effecting axial movement of said indicating unit by cooperation of said abutment member with said groove, and mechanism for effecting movement of said abutment member into and out of cooperative relationship with said groove.

17. Indicator mechanism for liquid dispensing systems, comprising, in combination, an indicator unit having indicia and movable to render said indicia visible, operating means for simultaneously rotating and axially shifting said indicating unit comprising a member provided with a spiral camming groove, a movable shuttle member having means to engage in said groove, one of said members being rotatable relative to the other of said members for effecting axial movement of said indicating unit by cooperation of the engaging means of said shuttle member with said groove, said indicating unit being rotatable with said rotatable member, and means engageable with said shuttle member upon axial movement of said indicating unit to a predetermined position for effecting movement of said engaging means out of cooperative relationship with said groove.

18. Indicator mechanism for liquid dispensing systems, comprising, in combination, an indicator unit having indicia and movable from a zero position to render said indicia visible, operating means for said indicator unit comprising a member provided with a spiral camming groove, a movable shuttle member having a part to engage in said groove, driving means for imparting a rotating movement to one of said members, said indicator unit being rotatable with said rotatable member, actuating mechanism for said shuttle member operative upon initial movement of said driving means to effect movement of said engaging part into cooperative relationship with said groove for causing axial movement of said indicator unit simultaneously with the rotating movement thereof, and manually operable connections to said actuating mechanism operative upon operation thereof to effect movement of said engaging part out of cooperative relationship with said groove after axial movement of said indicator unit from zero position.

19. Indicator mechanism for liquid dispensing systems, comprising, in combination, an indicator unit having indicia and movable from a zero position to render said indicia visible, operating means for said indicator unit comprising a member provided with a spiral camming groove, a movable shuttle member having a part to engage in said groove, driving means for imparting a rotating movement to one of said members, said indicator unit being rotatable with said rotatable member, actuating mechanism for said shuttle member operative upon initial movement of said driving means to effect movement of said engaging part into cooperative relationship with said groove for causing axial movement of said indicator unit simultaneously with the rotating movement thereof, and means engageable with said shuttle member upon axial movement of said indicating unit to a predetermined position for effecting movement of said engaging part out of cooperative relationship with said groove.

20. Indicating mechanism for liquid dispensing systems, comprising, in combination, an indicator unit having indicia arranged thereon, a single member connected with said indicator unit for simultaneously rotating and axially shifting the same from an initial position to cause said indicia to move from a zero position to an indicating position, driving means connected with said member to rotate the same, other means having cooperating engagement with said member to shift the same axially during its rotation, means for causing disengagement between said other means and said member to free said unit to permit it to return to its initial position, and means for causing reengagement between said other means and said member while said unit is in its initial or substantially zero position.

21. Indicating mechanism for liquid dispensing systems, comprising, in combination, an indicator unit having indicia arranged thereon, a single member connected with said indicator unit for simultaneously rotating and axially shifting the same from an initial position to cause said indicia to move from a zero position to an indicating position, driving means connected with said member to rotate the same, other means having cooperating engagement with said member to shift the same axially during its rotation, and means operable to cause disengagement between said other means and said member to free said member to permit it to return to its initial position and to cause reengagement between said other means and said member while said unit is in its initial or substantially zero position.

HENRY H. CAMPBELL.